July 11, 1967
K. W. TANTLINGER
3,330,579
HITCH CONSTRUCTION
Filed Oct. 23, 1965
2 Sheets-Sheet 1
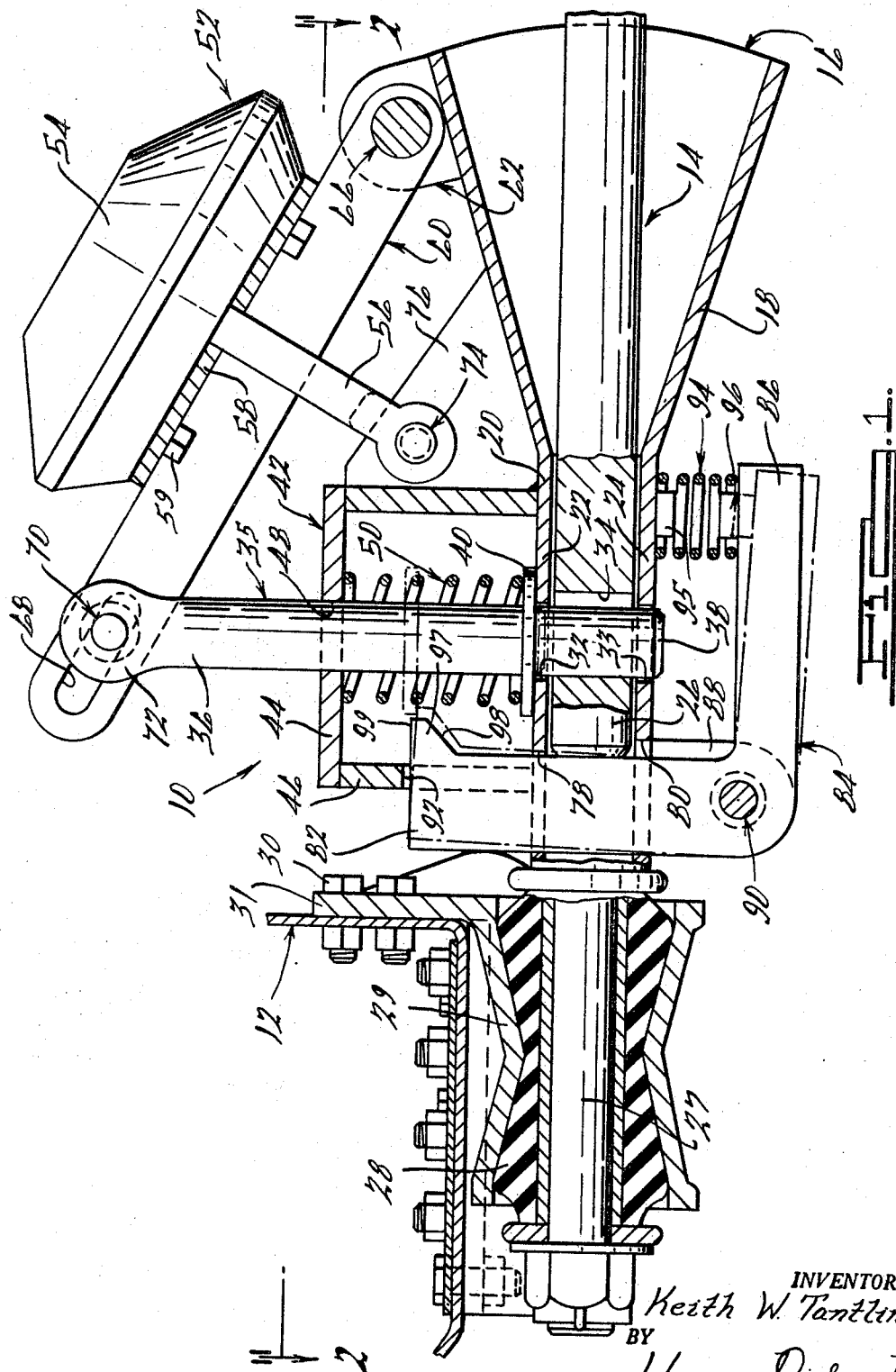
INVENTOR.
Keith W. Tantlinger
BY
Harness Dickey & Pierce
ATTORNEYS

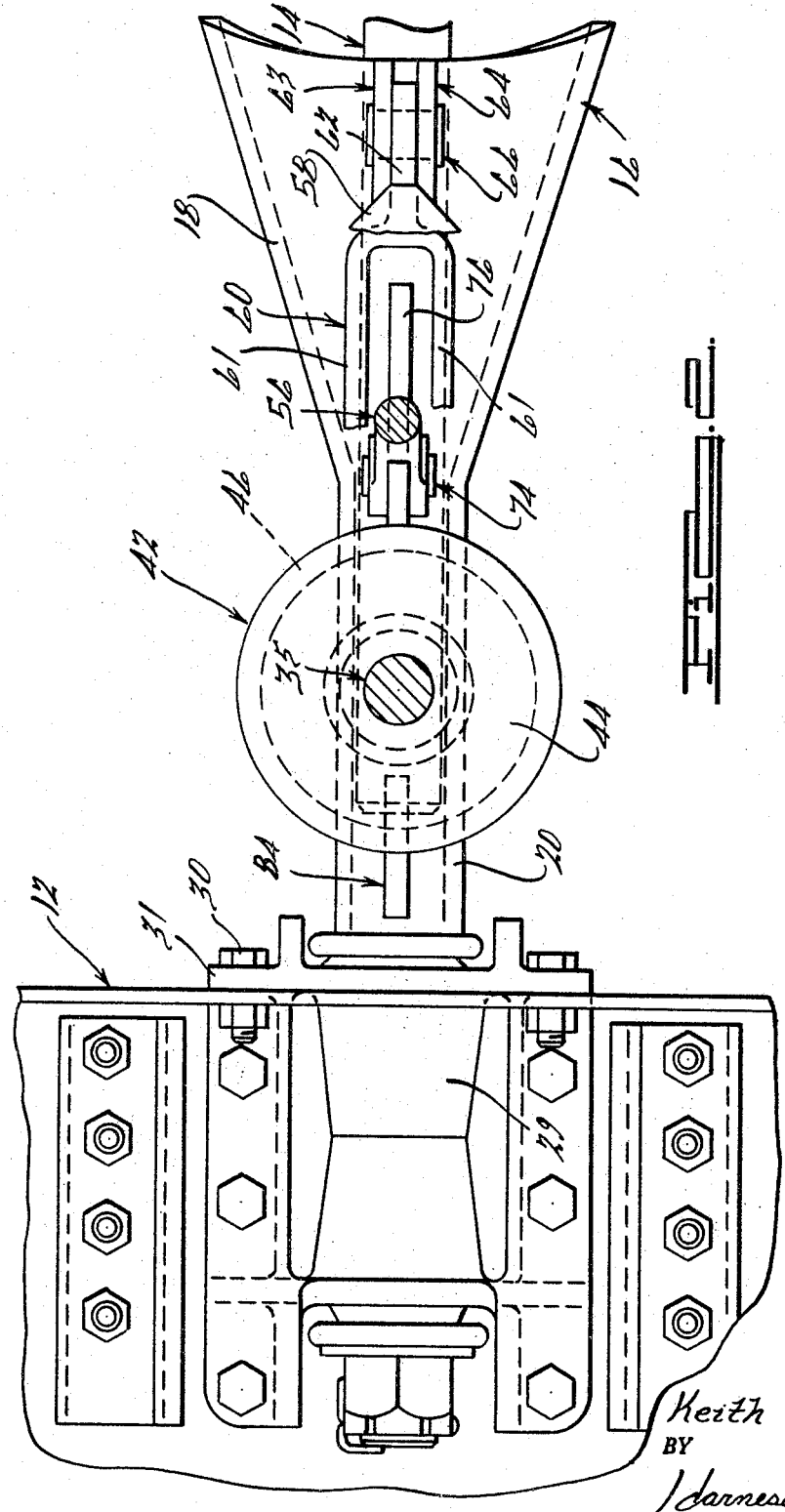

United States Patent Office 3,330,579
Patented July 11, 1967

3,330,579
HITCH CONSTRUCTION
Keith W. Tantlinger, Grosse Pointe Shores, Mich., assignor to Fruehauf Corporation, Detroit, Mich., a corporation of Michigan
Filed Oct. 23, 1965, Ser. No. 503,295
3 Claims. (Cl. 280—508)

ABSTRACT OF THE DISCLOSURE

A hitch construction for releasably connecting a portion of a first vehicle to a portion of a second vehicle; the hitch construction comprising a support structure for reciprocally mounting a locking pin; power means for biasing the locking pin to a retracted position; first spring means for resiliently urging the locking pin toward a locked position; latching means engageable with the pin for releasably maintaining the same in its retracted position; second spring means resiliently urging the latching means into engagement with the locking pin, and means resiliently supporting the hitch construction on the first vehicle; the latching means being arranged relative to the support structure such that when the drawbar on the second vehicle is inserted into a preselected portion of the hitch construction, the bar engages the latch means and biases the same out of engagement with the locking pin, whereby the pin is moved by means of the first spring means into a locked position lockingly securing the drawbar within the hitch construction.

The purpose of the above abstract is to provide a non-legal technical statement adapted to serve as a searching-scanning tool for scientists, engineers and researchers. Accordingly, this abstract is not intended to limit the scope of the invention hereinafter described in detail, nor is it intended to be used in interpreting or any way limiting the scope or fair meaning of the claims appended hereto.

---

This invention relates generally to hitch constructions of the type used for releasably connecting one or more wheeled trailer vehicles to each other or to a truck tractor. More particularly, the present invention relates to a hitch construction of the above character which is entirely automatic in operation.

In general, vehicle hitches interconnecting a tractor and a trailer dolly, two tandemly arranged trailers, or a tractor and a trailer, comprise a tongue or drawbar carried at its rearward end by the trailer or dolly and adapted to be releasably or detachably secured at its forward end to the tractor or forward trailer vehicle by means of a hitch mechanism located at the rearward end of the forward vehicle. Hitch constructions of the above character are commonly provided with a locking pin which is insertable through the connecting eye on the forward end of the associated drawbar, which locking pin is normally spring-biased to a forward or locked position by an associated coil spring or the like to prevent the pin from inadvertently moving to its retracted position and thereby releasing the drawbar from the mechanism. Such hitch constructions are also usually provided with some type of power actuated means that may be remotely energized, for example, from the tractor cab, for retracting the pin against the resistance of the aforesaid spring means and releasing or detaching the associated drawbar from the hitch mechanism.

One objectionable feature of such hitch mechanisms heretofore known and used resides in the fact that, although the locking pin can be retracted by the aforesaid power means and thereby enable the truck operator to selectively detach the trailer dolly or one or more trailers from the tractor without requiring that the operator leave the truck cab, at such times as it is desired to reattach a drawbar to its associated hitch mechanism, it has been necessary for the truck operator and/or some other person to manually retract the locking pin and hold it in a retracted position until the tractor and/or dolly or trailer vehicles are positioned such that the eye of the respective drawbar is properly oriented relative to its associated hitch mechanism, at which time the locking pin may be released and is resiliently biased to its locked position by the aforementioned spring means. Obviously, such heretofore known locking pin retracting techniques have been time and effort consuming for the truck operators and have frequently required unnecessary personnel.

The hitch construction of the present invention is adapted to solve the above described problems resulting from heretofore known types of hitch mechanisms and is believed to offer a material advancement in the vehicle art by providing a retaining latch arrangement which functions to automatically retain the locking pin in the retracted position to which it is biased by an associated power means. The retaining latch is located such that as the forward end of the drawbar is inserted or positioned within the hitch construction preparatory to reattaching the drawbar thereto, the eye section of the drawbar engages and trips the retaining latch, whereby the latch is disengaged from the pin to permit the pin to be automatically spring-biased to its locked position. Thus, the entire job of reattaching, as well as detaching, the drawbar and hitch construction can be accomplished automatically and solely by the truck operator.

It is accordingly a general object of the present invention to provide a new and improved hitch construction for releasably connecting a tractor and a trailer dolly, two trailers disposed in tandem, or a tractor and a trailer.

It is a more particular object of the present invention to provide a new and improved hitch construction of the above character which includes means for automatically retaining its associated locking pin in a retracted position until such time as the drawbar of the rearward vehicle is operatively positioned therewithin.

It is another object of the present invention to provide a new and improved hitch construction of the above character wherein the locking pin is automatically biased to its locked position at such time as the drawbar is properly oriented relative thereto.

It is still another object of the present invention to provide a new and improved hitch construction of the above character of a relatively simple design, which is easy to assemble and economical to commercially manufacture.

Other objects and advantages of the present invention will become apparent from the following detailed description taken in conjunction with the accompanying drawings, wherein:

FIGURE 1 is a longitudinal cross-sectional view of an exemplary hitch construction embodying the principles of the present invention; and FIGURE 2 is a top elevational view of the structure illustrated in FIGURE 1, as taken substantially along the line 2—2 thereof.

Referring now to the drawings, a hitch construction 10, in accordance with an exemplary embodiment of the present invention, is shown operatively mounted on a rear frame member 12 of a conventional truck tractor, forwardly located trailer or the like (not shown). The hitch construction 10 is adapted to provide for automatic attachment of a drawbar or tongue 14 of a trailer dolly, rearwardly located trailer or the like (not shown) to the forwardly located vehicle, in a manner hereinafter to be described.

As best seen in FIGURE 1, the hitch construction 10 comprises a drawbar receiving chute, generally designated 16, which consists of a forwardly converging frusto-conical section 18 that terminates at its left end in a narrow elongated hitching section 20 having upper and lower side portions 22 and 24 respectively, which are spaced apart a sufficient amount to permit the forwardly extending eye section 26 of the drawbar 14 to be slidably and removably inserted therebetween. By way of example, the chute 16 and hence the entire hitch construction 10 is secured to the frame member 12 by having a forwardly extending cylindrical section 27 on the chute 16 mounted within a resilient or shock absorbing sleeve 28 that is surrounded by a mounting collar 29 which is secured to the frame member 12 by suitable screws, bolts or the like 30 which extend through a mounting flange 31 on the collar 29.

The side portions 22 and 24 of the chute 16 are formed with vertically aligned apertures 32 and 33 which are adapted to register with a central opening 34 in the drawbar section 26 as the latter is operatively inserted within the chute 16 to the position illustrated in FIGURE 1. The drawbar 14 is adapted to be releasably or detachably secured within the chute 16 and hence to the forward vehicle (not shown) on which the hitch construction 10 is mounted, by means of an elongated vertically extending locking pin 35 which comprises upper and lower end sections 36 and 38, respectively, the latter of which is insertable through the openings 32, 33 and 34, when the drawbar 14 is properly positioned within the chute 16. The locking pin 35 is formed with a radially outwardly projecting retaining shoulder 40 which bears upon the upper portion 20 of the chute 16 to limit the amount which the lower end section 38 of the pin 35 extends through the openings 32, 33 and 34.

The locking pin 35 is supported for vertical reciprocal movement by means of a locking pin housing 42 which comprises an annular upper end section 44 and a cylindrical side wall section 46 that extends upwardly from the top of the chute portion 20 and is rigidly secured thereto as by welding or the like. As illustrated, the upper end section 36 of the locking pin 35 extends upwardly through a central opening 48 formed in the end section 44 of the housing 42. The locking pin 35 is normally biased downwardly to its forward or locking position illustrated in FIGURE 1 by means of a helical coil spring 50 which extends coaxially around a medial section of the locking pin 35, the upper end of the spring 50 abutting against the lower side of the section 44 and the lower end of the spring 50 abutting against the upper side of the retaining shoulder 40.

The locking pin 35 is adapted to be biased from the aforedescribed forward position to a retracted or upper position by means of a conventional hydraulically or pneumatically actuatable piston and cylinder assembly, generally designated by the numeral 52 and comprising a cylinder chamber 54 and reciprocable piston rod 56. The cylinder chamber 54 is adapted to be connected to an associated source of pressurized hydraulic or pneumatic actuating fluid and is secured to the upper side of a support plate 58 by means of suitable screws, bolts or the like 59, which plate 58 is pivotally secured to the upper side of an elongated pivot member, generally designated 60. As best seen in FIGURE 2, the member 60 comprises spaced parallel side sections 61 which are secured to an end section 62. The section 62 is pivotably secured at its right end between a pair of spaced parallel pivot members 63 and 64 that are welded or similarly secured to the upper side of the converging section 18 of the chute 16, a suitable pivot pin or the like 66 extending transversely through aligned openings in the right end of the end section 62 and members 63 and 64, as best seen in FIGURE 2. The opposite (left) end of the member 60 is formed with an elongated or oval shaped slot 68 and is pivotally secured to the upper end section 36 of the locking pin 35 by means of a pivot pin 70 which extends transversely through the slot 68 and is supported at its opposite ends within a bifurcated clevis type end portion 72 formed on the upper end of the locking pin section 36. As seen in FIGURE 2, the piston rod 56 extends downwardly between the side sections 61 of the member 60 and is pivotably connected at its lower end by a pivot pin 74 to a longitudinal web member 76 that extends between and is rigidly secured, as by welding or the like, to the upper side of the chute section 18 and a rearwardly directed side of the housing section 46.

It will be seen from the above described structure that upon actuation of the piston and cylinder assembly 52, the chamber 54 will move upwardly relative to the fixed piston rod 56, whereby the member 60 will be pivoted about the pin 66 in a clockwise direction, thereby biasing the locking pin 35 upwardly from the forward position indicated by the solid lines in FIGURE 1 to the retracted position indicated by the dotted lines in this figure. When the locking pin 35 is thus disposed in its retracted position, the drawbar 14 may be withdrawn from the chute 16, thereby releasing the rearward vehicle from the hitch mechanism 10. At such time as the piston and cylinder assembly 52 is deenergized, the coil spring 50 will tend to resiliently urge the locking pin 35 toward its forward position, as will later be described.

As best seen in FIGURE 1, the upper and lower portions 22 and 24 of the chute section 20 are formed with a second pair of vertically aligned openings 78 and 80, respectively, through which an upwardly extending leg section 82 of a generally L-shaped retaining latch 84 projects. The bracket 84 also includes a generally horizontally extending leg section 86 which is disposed adjacent the lower side portion 24 of the chute 16. A pair of downwardly extending, spaced parallel support ears, one of which is illustrated in FIGURE 1 and designated by the numeral 88, are secured to the lower side of the chute portion 24 on the opposite sides of the opening 80. The retaining bracket 84 is pivotably secured between the ears 88 by means of a transversely extending pin 90 and at a position where the leg section 82 of the bracket 84 extends upwardly within a cutaway portion or slot 92 formed in the forward side of the housing section 46. A helical coil spring 94 is interposed between the upper side of the leg section 86 of the latch 84 and the lower side of the chute section 20 and is normally retained therebetween by means of suitable annular bosses or the like 95 and 96 that are rigidly secured to the bottom of the chute section 200 and top of the leg section 86, as illustrated in FIGURE 1. The spring 94 functions to normally pivot the retaining latch 84 in a clockwise direction around the axis of the pivot pin 90, whereby the upper end of the retaining latch leg section 82 is urged toward the interior of the housing 42.

The upper end of the leg section 82 is formed with a rearwardly projecting locking shoulder portion 97 which defines a downwardly inclined surface 98 and a generally horizontally extending upper surface 99 that is coplanar with the upper end of the bracket leg section 82. It will be seen that as the locking pin 35 moves upwardly, upon energization of the piston and cylinder assembly 54, the retaining shoulder 40 will engage the inclined surface 98 of the shoulder portion 97 and thereby bias the retaining bracket 84 counterclockwise against the resistance of the spring 94 to the position indicated by the solid lines in FIGURE 1. At such time as the shoulder 40 moves out of alignment with the latch portion 97, the spring 94 will bias the bracket 84 to the position indicated by the dotted lines in FIGURE 1.

In operation of the hitch construction 10, the drawbar 14 is normally disposed in the position illustrated in FIG-1 with the lower end section 38 of the locking pin 35 extending through the aligned apertures 32, 33 and 34 of the chute 16 and the drawbar eye section 26. When it is desired to disconnect the drawbar 14 from the hitch construction 10, the piston and cylinder assembly 52 is initially energized, for example, by actuating a remotely located operating lever or valve to selectively communicate a source of actuating fluid to the chamber 84, whereby the locking pin 35 will move upwardly from the position indicated by the solid lines in FIGURE 1 to its retracted position indicated by the dotted lines in this figure. As the pin 35 is moved upwardly, the retaining shoulder 40 engages the shoulder portion 97 on the latch 84 and thereby biases the latch 84 counterclockwise about the pin 90 to the position indicated by the solid lines in FIGURE 1. As the shoulder 40 on the pin 35 moves above the upper surface 99 of the latch 84, the latch 84 will be automatically biased in a clockwise direction about the pin 90 to the positiion shown in dotted lines. At such time as the assembly 52 is deenergized, the spring 50, which is compressed during upward movement of the pin 35, resiliently biases the pin 35 downward until the lower side of the shoulder 40 engages the top of the latch portion 97, whereby the pin 35 will be automatically retained in its retracted position. After the pin 35 has been thus retained, the drawbar 14 may be easily removed or withdrawn from the hitch construction 10.

At such time as it is desired to reattach the drawbar 14 to the hitch construction 10, the vehicles to which these members are connected are moved toward each other while making sure that the drawbar 14 is supported in a manner such that the eye portion 26 thereof will be slidably inserted into the chute 16. The vehicles are moved toward each other until the forward (left) end of the drawbar 14 engages the right side of the latch 84, at which time the drawbar 14 will bias the latch 84 in a counterclockwise direction about the pin 90. As the latch 84 is thus moved, the shoulder portion 97 will move out of engagement with the retaining shoulder 40 on the pin 35, whereby the spring 50 will urge the pin 35 axially downward, resulting in the lower end section 38 thereof being inserted through the openings 32, 33 and 34 to lockingly secure the drawbar 14 within the construction 10.

While it will be apparent that the exemplary embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a hitch construction for releasably connecting the drawbar of a first vehicle to a second vehicle,
  a drawbar receiving chute comprising a converging section and a hitching section,
  an elongated cylindrical locking pin,
  a housing supporting said pin for sliding movement from a forward position extending through aligned openings in said hitching section to a retracted position spaced above said hitching section,
  said locking pin including a radially outwardly extending retaining shoulder,
  first spring means extending coaxially of one end of said pin and resiliently urging said pin toward said forward position,
  power means for biasing said locking pin from said forward position to said retracted position against the resistance of said first spring means,
  means operatively connecting said power means with said locking pin,
  a generally L-shaped retaining latch comprising first and second end sections and an intermediate mounting section,
  means disposed below said chute pivotably supporting said mounting section of said latch at a position wherein said first end section extends generally parallel to said locking pin and across one end of said hitching section of said chute and wherein said second end section extends perpendicular to said locking pin below said hitching section, and
  second spring means extending between the lower side of said hitching section of said chute and the upper side of said second end section of said retaining latch pivotably biasing said latch to a position wherein the upper end portion of said first end section engages said retaining shoulder on said locking pin when the same is biased to its retracted position by said power means, whereby to retain said pin in said retracted position,
  said drawbar being engageable with said first section of said latch interjacent said mounting section and said upper end portion as it is inserted into said chute whereby said upper end portion of said latch will be biased out of engagement with said retaining shoulder to permit said locking pin to be biased toward its forward position by said first spring means and thereby lockingly secure the drawbar within the chute.

2. The invention as set forth in claim 1 which includes shock absorbing means for supporting said hitch construction on one of the vehicles.

3. In a hitch construction for releasably connecting the drawbar of a first vehicle to a second vehicle,
  a drawbar receiving chute comprising a converging section and a hitching section,
  an elongated cylindrical locking pin,
  a housing supporting said pin for sliding movement from a forward position extending through aligned openings in said hitching section to a retracted position spaced above said hitching section,
  said locking pin including a radially outwardly extending retaining shoulder,
  first spring means extending coaxially of the upper end of said locking pin,
  said first spring means engaging said retaining shoulder and resiliently urging said locking pin toward said forward position,
  power actuating means comprising a piston rod and cylinder for biasing said locking pin from said forward position to said retracted position against resistance of said first spring means,
  support means for said cylinder including a support member having one end thereof pivotably mounted on said chute,
  the opposite end of said support member being pivotably connected to the upper end of said locking pin,
  said piston rod means being fixedly secured to said chute whereby energization of said actuating means will result in said support member and said locking pin moving upwardly relative to said chute,
  a generally L-shaped retaining latch comprising first and second end sections,
  said latch being pivotably mounted on said housing at a position wherein said first end section extends generally parallel to said locking pin and in the path of the drawbar as it is inserted into said hitching section of said chute,
  second spring means extending between the lower side of said chute and the upper side of said second end section,
  said second spring means pivotably biasing said retaining latch to a position wherein said first end section engages said retaining shoulder on said locking pin when the same is biased to its retracted position by said power means whereby to retain said pin in said retracted position, and
  means including shock absorbing means for resiliently supporting said hitch construction on the second vehicle,
  said retaining latch being engageable with the drawbar as it is inserted into said chute whereby said first end section of said latch will be biased out of engagement with said retaining shoulder to permit said locking pin to be biased toward its forward position by said first spring means and thereby lockingly secure the drawbar within the chute.

(References on following page)

References Cited

UNITED STATES PATENTS

| | | | |
|---|---|---|---|
| 1,649,980 | 11/1927 | Schlagenhauf | 280—508 |
| 1,837,940 | 12/1931 | Ade | 280—508 |
| 2,441,285 | 5/1948 | Pfeiffer | 280—50 X |
| 2,478,736 | 8/1949 | Balzer | 280—508 X |
| 2,844,390 | 7/1958 | Smith | 280—508 X |
| 3,161,422 | 12/1964 | Wade | 280—508 |

BENJAMIN HERSH, *Primary Examiner.*

C. C. PARSONS, *Assistant Examiner.*